No. 866,889. PATENTED SEPT. 24, 1907.
O. SANDERSON.
POTATO DIGGER.
APPLICATION FILED APR. 29, 1907.
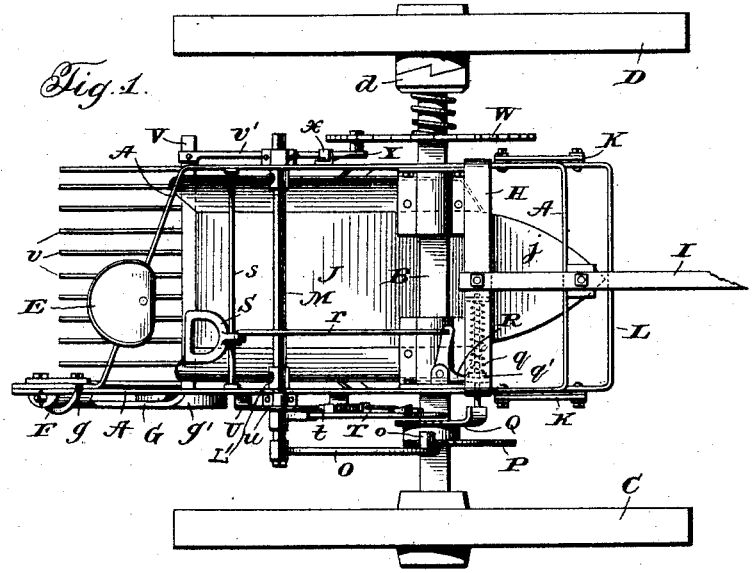
Fig. 1.
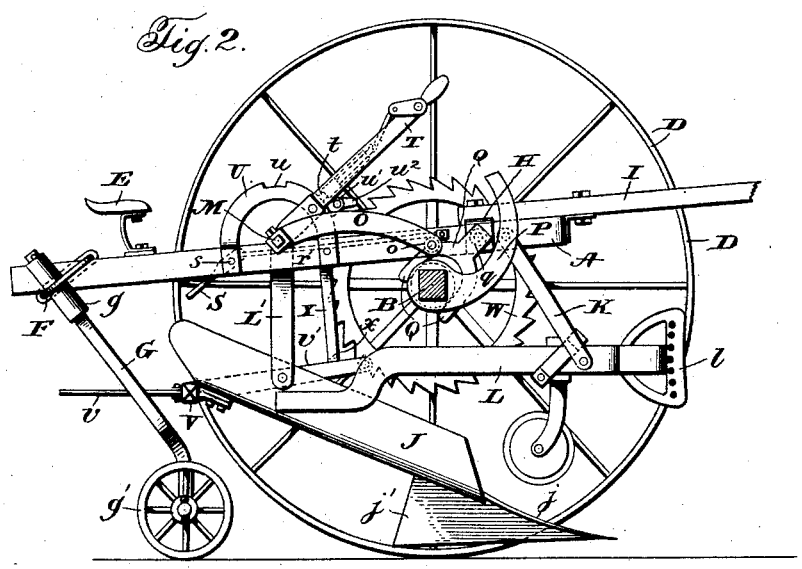
Fig. 2.
Fig. 3.
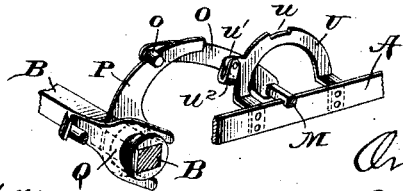
Witnesses:
Jas E Hutchinson.
J. L. Lawlor.
Inventor
Ora Sanderson
by Prindle and Williamson
Attorneys

UNITED STATES PATENT OFFICE.

ORA SANDERSON, OF CONESVILLE, IOWA.

POTATO-DIGGER.

No. 866,889.  Specification of Letters Patent.  Patented Sept. 24, 1907.

Application filed April 29, 1907. Serial No. 370,968.

*To all whom it may concern:*

Be it known that I, ORA SANDERSON, of Conesville, in the county of Muscatine and in the State of Iowa, have invented a certain new and useful Improvement in Potato-Diggers, and do hereby declare that the following is a full, clear, and exact description thereof, reference being had to the accompanying drawings, in which—

Figure 1 is a top plan view of a potato plow embodying my invention; Fig. 2 a side elevation with the near carrying wheel removed; Fig. 3 a detail perspective view of the plow-vibrating mechanism.

The object of my invention is to provide a potato plow or digger combining efficiency, simplicity of construction and facility of manipulation, and to such ends—

My invention consists in the potato plow or digger constructed substantially as hereinafter specified and claimed.

In the carrying of my invention into practice, I employ a light metal frame A mounted upon a carrying axle B which revolves in bearings upon the frame, and at one end has a wheel C fixed thereon to rotate the axle, and at the other end a wheel D clutched to the axle by a spring actuated clutch $d$ to facilitate turning of the machine, without undue strain or wrenching, such as would result were both rigidly mounted on the axle. The frame A is composed of parallel side members, a front transverse member extending at right angles to the side members, and an obliquely extending rear member on which is mounted a driver's seat E, one of the said members being projected rearward beyond the oblique member and having secured to the extension by a shackle or clip F a box or bearing $g$ for the standard G of a caster wheel $g'$. A short distance in rear of the front cross bar there is a cross bar H which extends from side to side of the frame, and to said two cross bars a tongue I is bolted.

A plow J having a point or share $j$ and an upwardly and rearwardly extended board with side pieces is suspended from the frame A by two pairs of links, one pair of links K being hung from the frame at or near the front thereof in advance of the carrying axle B, and being connected to the sides of a frame L which is attached to the plow sides and extends forwardly therefrom, and the other pair of links L' being suspended from the frame A in rear of the carrying axle, and having their lower ends pivotally connected to the plow sides. At its front the plow frame L has a clevis $l$, and attached to each side of said frame there is a colter wheel which is fastened to the frame by a shackle or clip, in a similar manner to the caster wheel $g'$. Hung by the links K and L', as described, it will be seen that the plow may swing longitudinally and vertically, and for so swinging it the rear links L' are attached to a rock shaft M extending transversely of the machine and journaled in bearings on the opposite sides of the frame A, said rock shaft being preferably square and the links having hubs with square sockets or openings to fit the squared shaft, so that by rocking the shaft the links will be rocked and the movement described imparted to the plow.

On a portion of the rock shaft projected beyond one of the sides of the frame A there is secured a crank arm O which extends forward from the rock shaft and at its front end carries a friction roller $o$ adapted to be engaged by a cam plate or arm P mounted upon and rotating with the axle B, said arm P having a hub with a square or angular socket to fit the axle. By the revolution of the cam arm in contact with the friction roller, the crank arm O will be lifted and the links L' will be swung forward and upward, thereby imparting a like movement to the plow, while when the cam arm in its revolution passes out of contact with the friction roll, the reverse movement will take place under the action of gravity. In order that this swinging or vibrating movement of the plow may be controlled, the cam arm is laterally movable on the axle, so that at will it may be placed into or out of position where it will act upon the friction roller on the crank arm, and as I preferably arrange it, it is normally in a position where it will not act upon the friction roller of the crank arm. The means I have devised in this connection comprise a fork Q which engages an annular groove in the hub of the cam arm, and is itself attached to a horizontal rod slidably mounted in a horizontal opening in the adjacent side of the frame A and a horizontal opening in a bracket bolted to the underside of the cross bar H, said rod being encircled by a coil spring $q$ which at one end bears against said bracket and at its other end against a collar $q'$ on the rod, which normally presses the rod and the fork in a direction to move and hold the cam arm in a position to one side of the friction roller of the crank arm.

Engaging the rod collar $q'$ on the side opposite the spring $q$ is one arm of a bell crank lever R pivoted to the frame A from which a rod or link $r$ runs rearwardly, and is connected to a stirrup or foot lever S pivoted to a cross rod $s$ attached at its ends to the frame sides, the foot lever or stirrup being in convenient position to be reached by the foot of the driver occupying the seat. By simple movement of the foot the driver can thus control the swinging or vibrating movement of the plow. Besides thus automatically vibrating the plow by power taken from the machine axle, I provide hand-operated means for lifting the plow at will, so that it may be moved to and held out of position for use, which means consists of a hand lever T on the rock shaft M having a spring actuated latch $t$, of usual construction, for coöperating with a notch $u$ in a segment or curved plate U fastened to the frame side concentric with the rock shaft. I also use the hand lever as part of a stopping device to limit the descent of the plow after it has been raised, providing for this purpose on the segment an ear or lug $u'$ against which the lever strikes and by which its descent is arrested; and to vary the descent of the plow I provide a movable abutment which consists of a block $u^2$ pivoted to the ear or lug so that it may be swung to place its free end into position to be engaged by the lever higher up than the ear or lug $u'$ and moved into a position where it will be entirely out of the way of the lever as the plow descends, leaving the lug or ear $u'$ alone as the stopping means or abutment.

Pivoted at the rear end or edge of the plow board is a screen consisting of a series of parallel forwardly and rearwardly extending fingers or rods $v$ attached at their front ends to cross bar or shaft V pivoted in brackets attached to the rear end of the plow board, and secured to said shaft alongside the plow is a forwardly extending crank arm $v'$ having at its front end a friction roller that lies in the path of a series of ratchet shaped teeth on the periphery of a wheel W secured to and rotating with the axle, so that as said wheel revolves by the action of its teeth upon the crank arm, the screen will be vibrated vertically, the arm being rocked upwards by the action of the wheel W and downward by gravity, and the downward movement being limited by a horizontal lug or foot $x$ on the lower end of a bar X fixed to the frame side. When the plow and screen are thrown forward and upward by the engagement of arm O and cam P, the arm $v'$ is free to ride forward and backward over the periphery of the wheel W, since the friction roller on the front end of the arm $v'$ will ride over the wheel teeth.

On the under side of the plow point or share and at the transverse center thereof is a rearwardly extending vertical plate $j$ which acts to cut or break up any clods or hard masses of dirt which may be encountered by the plow in its passage through the earth, but more especially to steady the plow.

The operation of my digger or plow will be readily understood. As it is drawn along, the plow, passing beneath the potatoes in the hills, will be automatically vibrated and the screen, besides partaking of the movements of the plow, will be vibrated up and down.

The movements of the plow are at all times under instant control, it being necessary when such movements are to be discontinued, merely to remove the foot from the foot lever or stirrup, and if it is desired to lift the plow out of action, this can be instantly and conveniently done by means of the hand lever T.

While especially designed for digging potatoes, it is, of course, to be understood that I do not restrict myself to this or any particular use of my machine.

Having thus described my invention, what I claim is:—

1. In a digger, the combination of a plow, a screen attached thereto, automatic means for vibrating the plow and screen backward and forward together, and separate automatic means for vibrating the screen vertically.

2. In a digger, the combination of a plow, a screen pivoted to the plow, automatic means for imparting a backward and forward movement to the plow and screen, and automatic means for imparting a vertical swinging movement to the screen.

3. In a digger, the combination of a plow, means for vibrating the same embracing a cam, and means for automatically rendering the cam inoperative.

4. In a digger, the combination of a plow, a movable support for the plow, an axle, a cam on the axle for moving the plow on its support, and means for changing the position of the cam on the axle.

5. In a digger, the combination of a plow, movable supporting means for the plow, including a shaft, automatic means for actuating said shaft, and hand-operated means for actuating said shaft.

6. In a digger, the combination of a plow, a movable support for the plow, automatic means for moving the plow, and hand-operated means for moving the plow.

7. In a digger, the combination of an axle, a frame, a plow, links suspending the plow from the frame, a rock shaft to which the links are connected, an arm on the rock shaft, a cam on the axle to actuate said arm, a screen pivoted to the plow, and a wheel on the axle to vibrate said screen.

8. In a digger, the combination of an axle, a frame, a plow, links suspending the plow from the frame, a rock shaft to which the links are connected, an arm on the rock shaft, a cam on the axle to actuate said arm, a screen pivoted to the plow, a wheel on the axle to vibrate said screen, and a hand-lever secured to said rock shaft.

9. In a digger, the combination of a plow, means for vibrating the same comprising a cam for moving the plow in one direction, and an adjustable stop to limit the movement of the plow in the opposite direction.

10. In a digger, the combination of a frame, a plow supported by the frame, an axle on which the frame is mounted, means for vibrating the plow comprising a cam, movably mounted on the axle, and a foot lever for controlling the movements of the cam.

In testimony that I claim the foregoing I have hereunto set my hand.

ORA SANDERSON.

Witnesses:
H. O. MEREDITH,
LEWIS WATERMAN.